United States Patent [19]

Broussaud

[11] 4,318,876

[45] Mar. 9, 1982

[54] METHOD OF MANUFACTURING A DENSE SILICON CARBIDE CERAMIC

[75] Inventor: Daniel Broussaud, Palaiseau, France

[73] Assignee: Societe Anonyme dite: Compagnie Generale d'Electricite, Paris, France

[21] Appl. No.: 193,827

[22] Filed: Oct. 3, 1980

[30] Foreign Application Priority Data

Oct. 19, 1979 [FR] France ................................ 79 26064
Aug. 27, 1980 [FR] France ................................ 80 18566

[51] Int. Cl.³ ............................................ C04B 35/56
[52] U.S. Cl. ........................................ 264/65; 501/90
[58] Field of Search ............... 106/44; 264/65, 66; 501/90

[56] References Cited

FOREIGN PATENT DOCUMENTS

4031 3/1979 European Pat. Off. .
1395946 4/1965 France .
2360534 3/1978 France .
2375152 7/1978 France .
2016524 9/1979 United Kingdom .

OTHER PUBLICATIONS

Bocker et al., "The Influence of Boron and Carbon Additions on the Microstructure of Sintered Alpha Silicon Carbide", Powder Metallurgy International, vol. 10, No. 2 (1978) pp. 87–89.

*Primary Examiner*—Edward J. Meros
*Assistant Examiner*—Mark Bell
*Attorney, Agent, or Firm*—Kenyon & Kenyon

[57] ABSTRACT

A method of manufacturing a dense silicon carbide ceramic includes heat treating an alpha silicon powder in a vacuum to between 1200° and 1400° C., adding a boron powder either before or after heat treating, then, adding a substance containing carbon, milling the mixture, compressing the milled mixture into a desired shape, sintering the formed shape at 2100° C. in an argon atmosphere. The method has particular application to manufacturing parts for gas turbines.

14 Claims, No Drawings

METHOD OF MANUFACTURING A DENSE SILICON CARBIDE CERAMIC

BACKGROUND OF THE INVENTION

The present invention relates to a method of manufacturing a dense silicon carbide ceramic.

A known method of manufacturing dense silicon carbide ceramics is described in the technical article entitled "The influence of boron and carbon additions on the microstructure of sintered alpha silicon carbide" by W. Bocker and H. Hausner, taken from the American journal "Powder Metallurgy International" volume 10, No. 2, 1978, pages 87 to 89. The starting material used in this method is an alpha type silicon carbide powder. The material, to which gasoline is added first, undergoes treatment in hydrofluoric acid and is then washed several times to remove the silica and the residual oxygen from the powder. The powder thus obtained is ground in a ball-mill and then treated in hydrochloric acid to remove the iron left by the grinding. The powder is then heated to 700° C. to remove the residual free carbon, and is then treated a second time in hydrofluoric acid. After further heat treatment at 1200° C. under an argon atmosphere, amorphous boron and a carbon source are successively added to the powder, said carbon source being polyphenylene dissolved in benzene. After removal of the benzene in an air stream, a sample is taken by pressing powder impregnated with oleic acid in a steel die to a pressure of 100 N/mm². Lastly, the sample is sintered under an argon atmosphere at a temperature of about 2000° C.

The method described hereinabove has the disadvantage of being complicated. Indeed, it includes two chemical treatments in hydrofluoric acid which last for a long time. Further, these chemical treatments to not make it possible to remove completely the residual oxygen from the powder; this reduces the density of the ceramic obtained.

The present invention aims to mitigate these drawbacks and to bring into effect a simpler and more effective method for manufacturing a dense silicon carbide ceramic.

SUMMARY OF THE INVENTION

The present invention provides a method of manufacturing a dense silicon carbide ceramic, said method comprising:

preparing a mixture which contains alpha silicon carbide, boron and a substance containing carbon; and sintering a sample of the mixture under an inert atmosphere at a temperature of about 2100° C.;

wherein the preparation of the mixture includes heat treating an alpha silicon carbide powder in a vacuum at a temperature higher than 1200° C.

DETAILED DESCRIPTION OF THE PREFERRED EMBODIMENTS

Two particular ways of performing the method of the invention are described hereinbelow by way of example.

FIRST EXAMPLE

The first way starts with a commercial silicon carbide powder which has an alpha type structure and is obtained by the Acheson method. Said powder may have, for example, a specific surface area of 7 m²/g, the average size of the grains being about two microns. It contains impurities which mainly include oxygen at up to 4000 parts per million (ppm) and various metals combined with carbon or oxygen at up to 3000 ppm.

One percent by weight of powdered crystallized boron dispersed in a volatile organic liquid such as gasoline or cyclohexane is added to the powder.

The suspension thus obtained is ground in a steel ball-mill. For example, with a suspension which contains 40 g of a silicon carbide-boron mixture in 140 cm³ of cyclohexane, the ball-mill has 1.6 kg of balls which rotate at a speed of 190 rpm for 4 hours.

After crushing, the substances in suspension are filtered and dried in an oven.

The dry powder thus obtained contains a fairly large quantity of iron which comes from the balls and from the body of the ball-mill. The powder is therefore treated with hot diluted hydrochloric acid until all the iron is removed, then it is washed in de-ionized water.

The suspension which results from the washing process is decanted and then dried in an oven after removal of excess water. In the particular conditions specified hereinabove, the powder thus dried has a specific surface area of 13 m²/g.

The powder is then placed in a carbon crucible in the center of a graphite resistance furnace. The furnace is provided with a vacuum pump by which the pressure in the furnace is lowered down to about $5 \times 10^{-6}$ Torr. Then the furnace temperature is raised steadily until it reaches a maximum temperature lying between 1200° and 1400° C. after one hour.

During the temperature rise, the evolution of gas from the powder is observed. It causes the pressure in the furnace to rise temporarily.

The maximum temperature is maintained for about an hour, then the electricity supply to the furnace is switched off.

After the heat treatment, the substance collected in the crucible has a specific surface area which is now only 4 m²/g.

A suspension of the powder is then formed in water or alcohol to which a phenolic lacquer is added. The lacquer is such that on pyrolysis it yields a dry residue containing 60% carbon.

The suspension which contains the lacquer is placed in a plastic jar which contains steel balls coated with polytetrafluoroethylene, then the suspension is homogenized for one hour by rotating the jar.

The suspension is then dried in a rotary evaporator and the powder thus obtained is sifted.

A sample of the ceramic part to be produced is then shaped.

This is done, e.g., by a well-known method which consists in pressing the powder in a steel die at pressure of about 2000 bars. The sample can also be shaped by applying isostatic pressure to the powder in a rubber finger or by casting a suspension of the powder in water to which a deflocculating agent has been added into a plaster mould.

Finally, the sample is sintered under an argon atmosphere at a temperature of about 2100° C. for about 30 minutes.

The silicon carbide ceramic part obtained after sintering may, for example, have a density which lies between 90 and 98% of the theoretical density of the silicon carbide. Its chemical and mechanical properties are compatible with the use of this material for manufacturing components for gas turbines and/or for diesel engines. Its ultimate tensile stress under three-point bending is higher than 400 M Pa at 1400° C.

SECOND EXAMPLE

A second way of performing the method of the present invention also starts with a commercial silicon carbide powder which has an alpha type structure and is obtained by the Acheson method. In the example described, the powder has a specific surface area of about 7 m$^2$/g. It may contan impurities which mainly include oxygen at up to 4,000 parts per million (ppm), various metals and silicon, combined or otherwise with up to 3,000 ppm of oxygen.

The powder is placed in a carbon crucible in the center of a graphite resistance furnace. The furnace is provided with a vacuum pump. Advantageously, to reduce the cost price, the pump can be a primary vacuum pump which makes it possible to reach pressures down to about 1 torr, but a secondary vacuum pump may also be used to obtain a vacuum of about $5 \times 10^{-6}$ torr.

The temperature of the furnace is then raised steadily to obtain a maximum temperature lying between 1200° C. and 1600° C.

If a secondary vacuum pump is used, a temporary rise in the pressure in the furnace is then observed. This rise is caused by the gases which evolve from the powder.

Maximum temperature is maintained for a period of time varying between 5 minutes and 6 hours, depending on the temperature, the pumping capacity and the quantity of impurities containing in the powder being treated.

Preferably, the maximum temperature of the furnace is set at a high value substantially equal to 1600° C. to reduce the duration of the heat treatment. By way of example, a heat treatment which requires one hour at 1400° C. can be performed in five minutes at 1600° C.

After the heat treatment, the powder has a specific surface area of about 2 m$^2$/g and includes residual oxygen at about 500 ppm. The specific surface area of the powder is reduced by the heat treatment by reducing the percentage of the finest particles in the powder. The heat treatment also causes a loss of weight which, for example, may be up to 6 to 7% of the weight of the non-treated powder.

1% by weight of powdered crystallized boron is added to the treated powder by dispersing the mixture in a volatile organic liquid such as gasoline or cyclohexane.

The suspension thus obtained is ground in a steel ball-mill. For example, with a suspension which contains 30 g of a silicon carbide-boron mixture in 140 cm$^3$ of cyclohexane, the ball-mill has 1.6 kg of balls with a diameter of 3 mm which rotate at a speed of 300 rpm for 4 hours.

After drying, the powder contains a fairly large quantity of iron which comes from the balls and from the body of the ball-mill. The powder is therefore treated with diluted hydrochloric acid until substantially all the iron is removed, then it is washed in acidulated de-ionized water.

The suspension which results from the washing process is decanted and then dried in an oven after removal of excess water.

The powder thus dried has a specific surface area of about 9 m$^2$/g. This value is clearly higher than that (4 m$^2$/g) of the powder obtained, from an analogous starting powder, in the first example, in which the heat treatment and crushing operations occur in the opposite order.

A suspension of the powder is then formed in water or alcohol to which a phenolic lacquer is added. The lacquer is such that on pyrolysis it yields a dry residue containing 60% carbon.

The suspension which contains the lacquer is placed in a plastic jar which contains steel balls coated with polytetrafluoroethylene, then the suspension is homogenized for one hour by rotating the jar.

The suspension is then dried in a rotary evaporator and the powder thus obtained is sifted.

A sample of the ceramic part to be produced is then shaped.

This is done, e.g., by a well-known method which consists in pressing the powder in a steel die at a pressure lying between 500 and 2000 bars. The sample can also be shaped by applying isostatic pressure to the powder in a rubber finger or by casting a suspension of the powder in water to which a deflocculating agent has been added into a plaster mould.

Finally, the sample is sintered under an argon atmosphere at a temperature of about 2100° for about 30 minutes.

The silicon carbide ceramic parts obtained after sintering may, for example, have a density which lies between 95 and 98% of the theoretical density of the silicon carbide.

It is seen that in the second example, the density of the ceramic parts obtained is more reproducible.

These parts can be used for manufacturing components of gas turbines or of diesel engines.

In comparison with the prior art method described in the aforementioned article, it is apparent that both ways of performing the method described hereinabove have the advantage of removing oxygen and silica from the starting powder by heat treatment in a vacuum. This is much more simple and much more effective than the chemical treatment with hydrofluoric acid used in the prior art.

Further, boron is added before crushing. A boron powder can therefore be used which has a larger grain size and is therefore cheaper and eliminates a mixing operation.

It should also be observed that carbon is added in the form of a phenolic lacquer—a very much cheaper substance than polyphenylene which is used in the prior art. The lacquer is soluble in solvents such as water or alcohol which do not evolve dangerous vapours as does benzene.

Lastly, in the method of the present invention, it is not necessary to incorporate an organic binder in the powder when the sample is shaped.

I claim:
1. A method of manufacturing a dense silicon carbide ceramic body, the method including milling a particulate material containing silicon carbide to reduce the size of the particles, adding powdered boron to the particulate material; adding a substance containing carbon to the particulate material, forming the milled particulate material after adding the boron and the substance containing carbon into a body of desired shape, and sintering said body at a temperature of about 2100° C., wherein the improvement comprises:
heat treating said particulate material containing silicon carbide, the silicon carbide consisting of alpha silicon carbide powder, in a vacuum at a temperature higher than 1200° C. and no more than 1600° C. prior to adding said substance containing carbon.

2. A method according to claim 1, wherein the boron powder is added to the silicon carbide powder before the heat treatment.

3. A method according to claim 2, wherein before the heat treatment, the silicon carbide and boron powder are mixed with a volatile organic liquid, ground in a steel ball-mill and dried in an oven.

4. A method according to claim 3, wherein before the heat treatment, the ground and dried powder undergoes treatment in hydrochloric acid followed by washing in water to remove iron from the steel balls.

5. A method according to claim 1, wherein the substance containing carbon is a phenolic lacquer dissolved in a solvent.

6. A method according to claim 1, wherein before pressing and sintering, the mixture passes through a ball-mill whose balls are coated with polytetrafluoroethylene, the mixture then being dried and sifted.

7. A method according to claim 5, wherein the solvent is water.

8. A method according to claim 5, wherein the solvent is ethanol.

9. A method according to claim 1, wherein the powdered boron is added after the alpha silicon carbide powder has undergone heat treatment.

10. A method according to claim 9, wherein the mixture of silicon carbide and boron powders is successively mixed with a volatile organic liquid, ground in a steel ball-mill and then dried in an oven.

11. A method according to claim 10, wherein after the heat treatment, the ground and dried powder undergoes a treatment in hydrochloric acid followed by washing in water.

12. A method according to claim 11, wherein the substance containing carbon is a phenolic lacquer dissolved in a solvent, the lacquer being added after the powder has been washed in water.

13. A method according to claim 1, wherein the temperature of the heat treatment is substantially equal to 1600° C.

14. A method according to claim 9, wherein the heat treatment is carried out in a primary vacuum of about one torr.

* * * * *

UNITED STATES PATENT AND TRADEMARK OFFICE
CERTIFICATE OF CORRECTION

PATENT NO. : 4,318,876
DATED : 9 March 1982
INVENTOR(S) : Daniel BROUSSAUD

It is certified that error appears in the above—identified patent and that said Letters Patent is hereby corrected as shown below:

In the Abstract, line 7: after "shape," insert --and--.

Column 1, line 36: change "to" to --do--.

Column 2, line 27: change "Torr." to --torr.--.

Column 2, line 53: after "at" insert --a--.

Column 3, line 31: change "containing" to --contained--.

Column 5, line 21: change "fluorothylene" to --fluoroethylene--.

Signed and Sealed this

Twenty-second Day of June 1982

[SEAL]

Attest:

GERALD J. MOSSINGHOFF

Attesting Officer     Commissioner of Patents and Trademarks